United States Patent
Parr et al.

(10) Patent No.: US 9,164,163 B2
(45) Date of Patent: Oct. 20, 2015

(54) SYSTEM AND METHOD FOR ESTIMATING TERMINAL POSITION BASED ON NON-GEOSTATIONARY COMMUNICATION SATELLITE SIGNALS

(75) Inventors: Michael Parr, Del Mar, CA (US); Michael Rodgers, San Diego, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 684 days.

(21) Appl. No.: 13/398,776

(22) Filed: Feb. 16, 2012

(65) Prior Publication Data
US 2013/0214968 A1    Aug. 22, 2013

(51) Int. Cl.
*G01S 5/12* (2006.01)

(52) U.S. Cl.
CPC ........................................ *G01S 5/12* (2013.01)

(58) Field of Classification Search
CPC ........... G01S 5/12; G01S 11/10; G01S 19/40; G01S 19/42
USPC ............. 342/357.78, 357.21, 457.23, 357.25, 342/357.4; 701/468, 503
See application file for complete search history.

(56) References Cited

U.S. PATENT DOCUMENTS

| | | | | |
|---|---|---|---|---|
| 5,969,669 A | * | 10/1999 | Ishikawa et al. | 342/357.2 |
| 7,133,772 B2 | * | 11/2006 | van Diggelen | 701/469 |
| 8,125,378 B1 | * | 2/2012 | Jarpenvaa | 342/357.46 |

* cited by examiner

*Primary Examiner* — Dao Phan
(74) *Attorney, Agent, or Firm* — Potomac Technology Law, LLC

(57) ABSTRACT

A device is provided for use with a satellite and a receiver having a local oscillator. The satellite is traveling in a vector and transmits a signal having an expected frequency. The receiver receives a received signal having a received signal frequency. The device includes: a Doppler shift measuring portion measuring a Doppler shift $D_m$; a predetermined Doppler shift storage portion storing a predetermined received Doppler shift $D_p$; a received signal Doppler shift error calculating portion calculating a received signal Doppler shift error $D_e$; a predetermined receiver position storage portion storing a predetermined position $P_p$ of the receiver; and a receiver position estimating portion calculating an estimated receiver position $P_e$ based on the predetermined position $P_p$ of the receiver and the received signal Doppler shift error $D_e$.

16 Claims, 12 Drawing Sheets

SYSTEM AND METHOD FOR ESTIMATING TERMINAL POSITION BASED ON NON-GEOSTATIONARY COMMUNICATION SATELLITE SIGNALS

BACKGROUND

The present invention generally deals with satellite communications. A user terminal communicates with other terminals or with a gateway that gives the user terminal access to internet, by way of a satellite. A user terminal may stay in one position or may be mobile e.g., satellite phones or computers capable of communicating with a satellite.

In order to effectively communicate with a satellite in some systems, a user terminal must know where to transmit its signal. In other words, a user terminal needs to know both its position and the position of the satellite to effectively communicate with the satellite.

In situations where the user, terminal does not move, the user terminal is generally provided with its position information. In some situations, satellite position information may be provided to the user terminal by the ephemeris data, which provides orbital and time information of communication satellites that are orbiting around the world. Based on this information, the user terminal will know where and when a satellite is going to be in a position to communicate. The geographic location information of the stationary user terminal is known and does not generally need to be updated. So, communication between the user terminal and the satellite communication system can be easily established based on the known position of user terminal and the known position of the communication satellite. But this becomes complicated when the user terminal is moving.

In the situation where the user terminal is moving, the user terminal has to constantly update its position information. Conventionally this is done by receiving position information from GPS satellites. A GPS satellite continuously transmits signals that provide time information and the satellite's orbital information, called ephemeris data. A GPS receiver within the user terminal may calculate position information based on the transmit time of the received signal. It uses this information to compute its distance to a plurality of satellites within a GPS constellation. These distances along with the satellite's position are used to compute the position of the receiver.

Typically, in conventional satellite communication systems, a user terminal that communicates with the communication satellite needs to know its own position. Generally, this position information is provided to the user terminal by the GPS satellite system. There are times though that a user terminal may lose communication with the GPS satellite system and therefore be unable to determine its position. As such, because the user terminal cannot determine its position at some points, the user terminal loses communication with the communication satellite. This will be further described with reference to FIGS. 1A-1C.

FIG. 1A shows a wireless communication system at a time $T_0$.

As shown in the figure, the system includes a communication satellite 100, a GPS satellite 102, and a car 114 housing a user terminal 116 (not shown) at position 104.

Communication satellite 100 is operable to communicate bi-directionally with user terminal 116 within car 114 by way of communication channel 106. GPS satellite 102 is operable to send GPS signals to user terminal 116 within car 114 by way of communication channel 108. For purposes of discussion, only one GPS satellite is shown. However, one of ordinary skill would recognize that the user terminal is going to be able to communicate with a constellation of GPS satellites, although only one is represented here.

In a typical situation, user terminal 116 in car 114 communicates with communication satellite 100. In order to do this, user terminal 116 needs to know its GPS position. User terminal 116 may obtain its GPS position from GPS satellite 102 via communication channel 108.

There may be situations where user terminal 116 is unable to receive signals from GPS, satellite 102 because, for example, the car goes into a tunnel, trees or clouds block the signal. In other situations, the user terminal may be carried on a person, where the person might go inside a building. The state of the wireless communication system when the user terminal is unable to receive signal from GPS satellite 102 will be described with reference to FIG. 1B.

FIG. 1B shows the state of the wireless communication system of FIG. 1A at time $T_1$, where car 114 is at position 110.

As the car moves from position 104 to position 110, the car is still able to communicate with communication satellite 100. But, as discussed above, the car has lost the signal from GPS satellite 102. In this example, user terminal 116 is in car 114.

When user terminal 116 is unable to determine its own position, for example with a loss of GPS information as a result of a loss of communication with GPS satellite 102, user terminal 116 will be unable to communicate with communication satellite 100. This will be described with reference to FIG. 1C.

FIG. 1C shows the state of the wireless communication system of FIG. 1B at a later time, time $T_2$, where car 114 is at position 112.

As the car continues to move from position 110 to position 112, car loses communication with both, communication satellite 100 and GPS satellite 102. User terminal 116 loses communication with GPS satellite 102 as discussed above with reference to FIG. 1B. As a result user terminal 116 is unable to determine its own position. Without position information provided by the GPS satellite 102 user terminal 116 is unable to transmit to by satellite 100.

What is needed is a system and method that enables a mobile user terminal to communicate with a satellite without relying on GPS.

BRIEF SUMMARY

The present invention enables a user terminal to determine its position using only signals from communication satellites. Thus, the need for near-continuous GPS position availability is removed.

In accordance with an aspect of the present invention, a device is provided for use with a satellite and a receiver having a local oscillator. The satellite is traveling, at any instant, in a vector and transmits a signal having an expected frequency. The receiver receives a received signal having a received signal frequency. The device includes: a Doppler shift measuring portion measuring a Doppler shift $D_m$; a predetermined Doppler shift storage portion storing a predetermined received Doppler shift $D_p$; a received signal Doppler shift error calculating portion calculating a received signal Doppler shift error $D_e$; a predetermined receiver position storage portion storing a predetermined position $P_p$ of the receiver; and a receiver position estimating portion calculating an estimated receiver position $P_e$ based on the predetermined position $P_p$ of the receiver and the received signal Doppler shift error $D_e$.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with aspects of the present invention, a user terminal is able to determine its position without using a GPS satellite. The user terminal uses ephemeris data to determine the relative delay and Doppler frequency offset of each communications satellite based on the position of user terminal. Based on its position, user terminal can determine the expected Doppler frequency offset from any satellite. The differences between the expected frequency and the observed frequency are used to correct the local frequency reference and user terminal's estimated position. Thus, the present invention is able to determine its position by measuring the Doppler shift in the frequency of signals from the communication satellite.

In one example embodiment, the user terminal is able to measure the Doppler shift from communication satellite at two points along its orbit. In another embodiment, the user terminal is able to determine its position based on the Doppler shift of the communication signal from one satellite at one point along its orbit and the Doppler shift of the communication signal from another communication satellite at another time along another orbit. As a result, the present invention does not need to use a GPS constellation to determine its location.

Aspects of the present invention will now be described in greater detail with reference to FIGS. 2A-10.

Figure 1A:
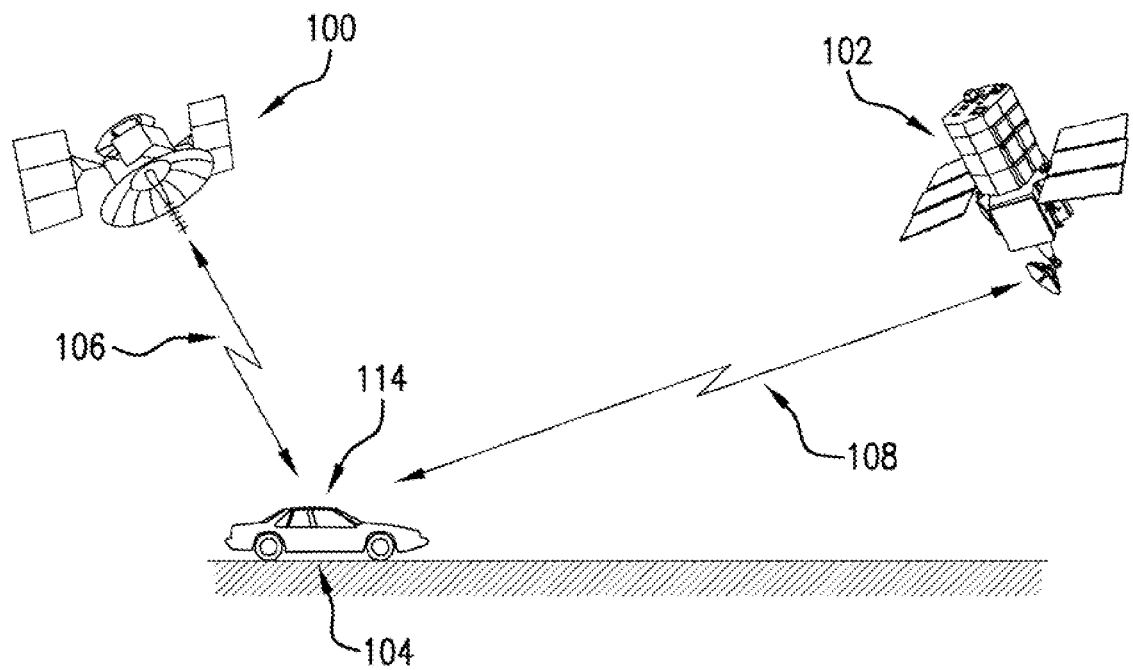
FIGS. 1A-C show a wireless communication system at a times $T_0$, $T_1$ and $T_2$, respectively.
Figure 1B:
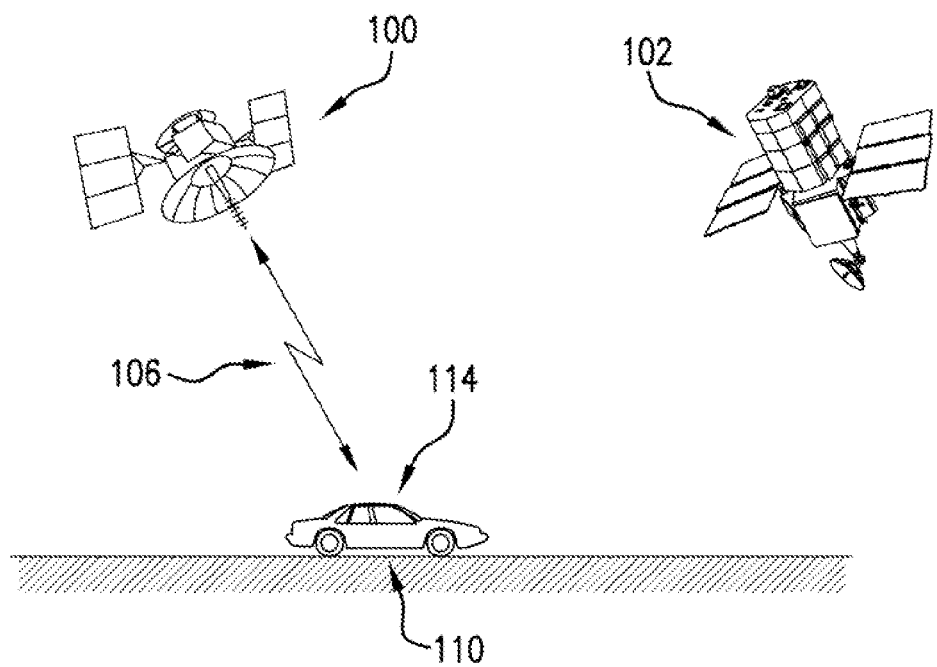
Figure 1C:
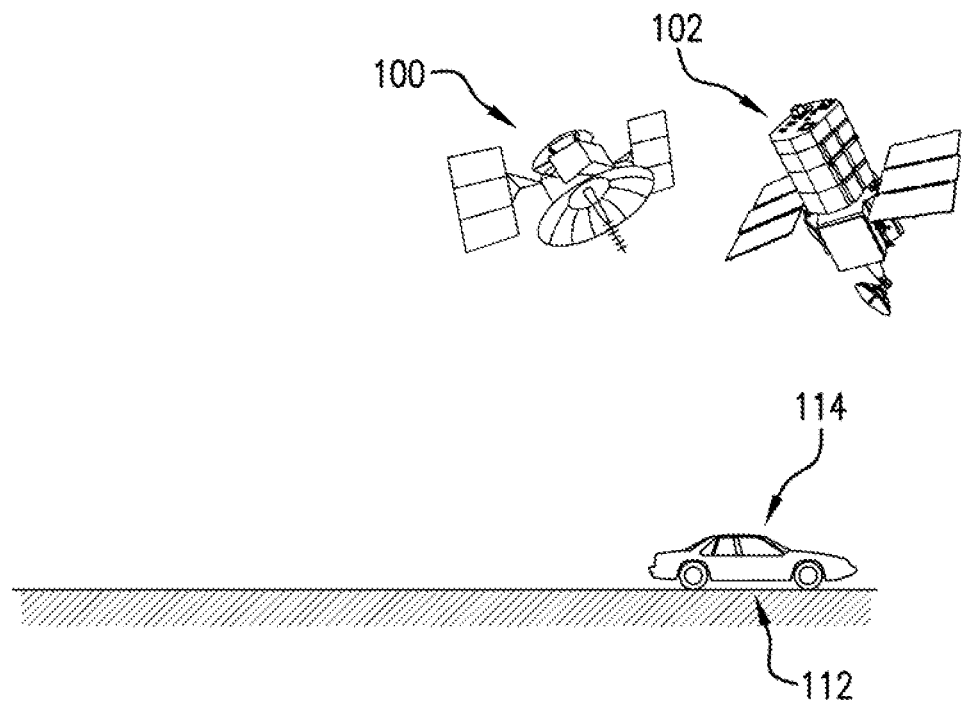
Figure 2A:
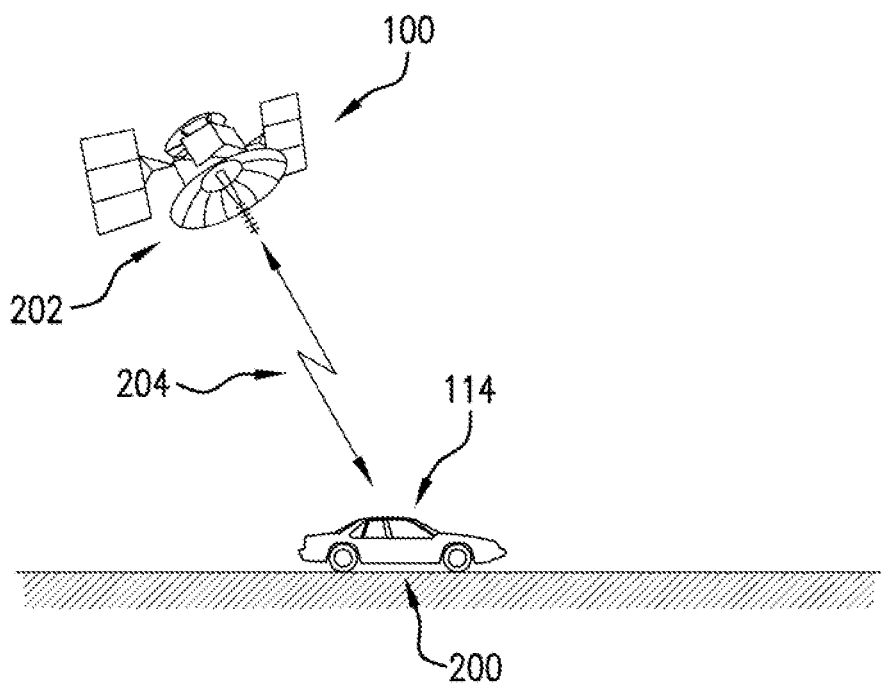
FIGS. 2A-B show a wireless communication system in accordance with aspects of the present invention at times $T_3$ and $T_4$, respectively.

FIG. 2A shows a wireless communication system at time 73, in accordance with aspects of the present invention.

As shown in the figure, the system includes a car 114, housing a user terminal 116 (not shown) at position 200 and a communication satellite 100.

Communication satellite 100 at position 202 is operable to communicate bi-directionally with user terminal 116 by way of communication channel 204.

User terminal 116 includes empheris data that gives position of the satellite. It also has satellite's orbit from which it knows satellite's velocity. Based on this velocity there is going to be an expected Doppler frequency offset.

Figure 2B:
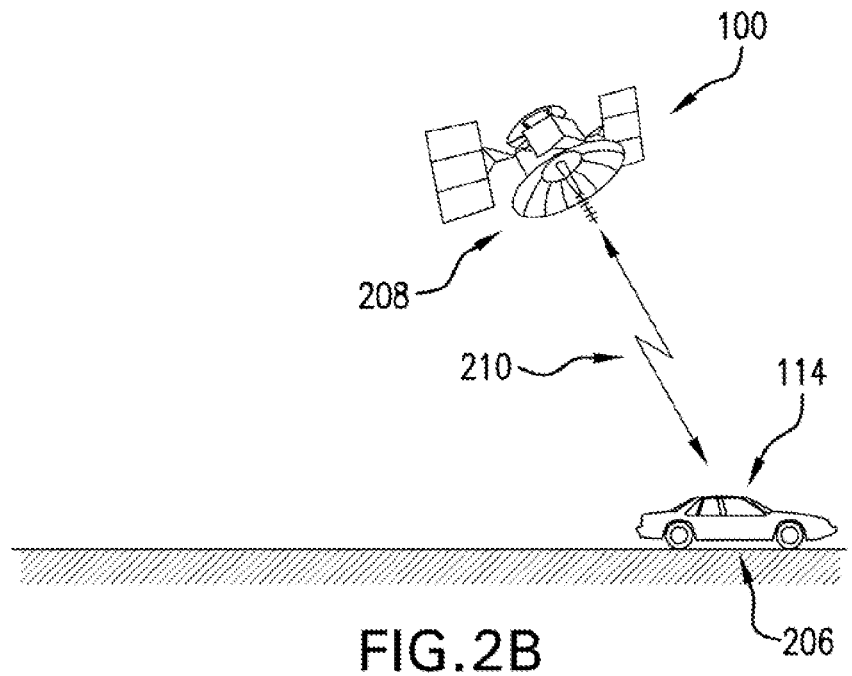

FIG. 2B shows the state of the wireless communication system of FIG. 2A at time $T_4$, where communication satellite 100 is at position 208 and car 114 is at position 206.

Communication satellite 100 at position 208 is operable to communicate hi-directionally with user terminal 116 within the car 114 by way of communication channel 210.

As the car moves from position 200 to position 206, the car is still able to know calculate position by communicating with communication satellite 100 which has also moved to a new position 208.

The Doppler shift of the communication signal from the satellite to the user terminal is constant along the surface of a cone based on a vector from the satellite to the user terminal. This will be further explained with additional reference to FIG. 3.

Figure 3:
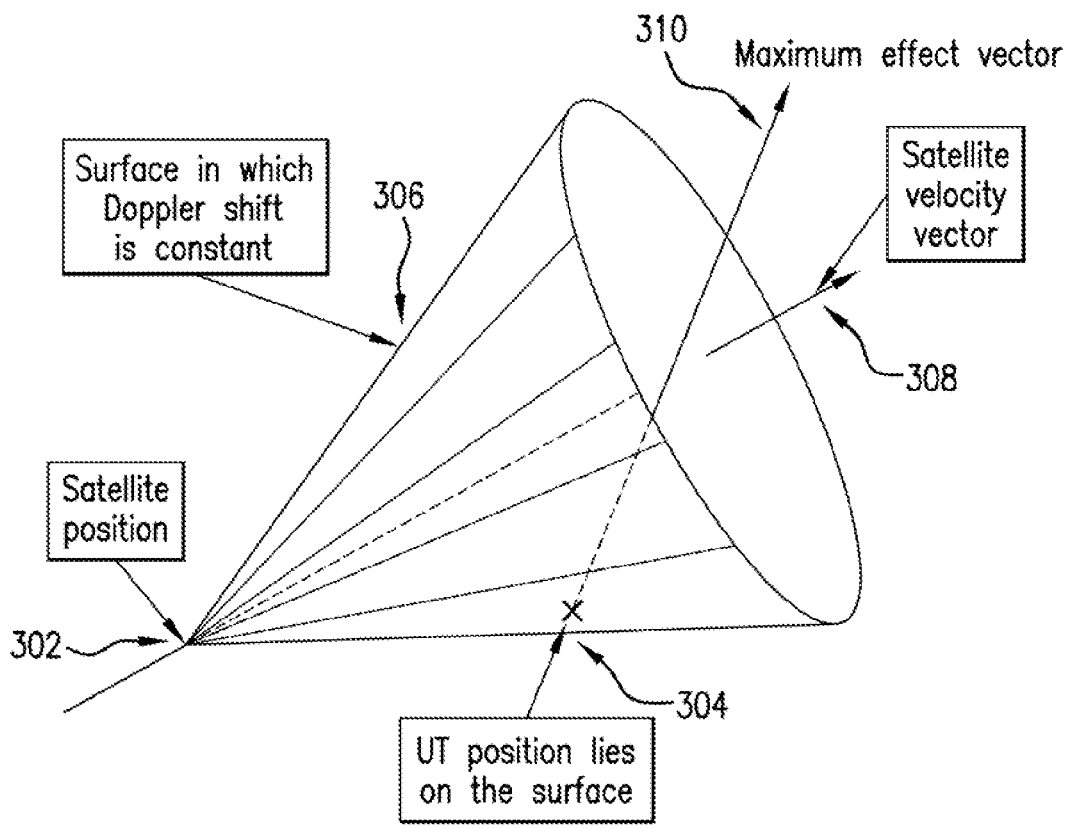
FIG. 3 illustrates the surface of a cone in which a Doppler shift of a signal from a satellite to a user terminal at a time $T_4$ is constant.

FIG. 3 illustrates the surface of a cone 306 in which a Doppler shift of a signal from a satellite 100 to a user terminal 116 at a time $T_4$ is constant.

As shown in the figure, satellite 100 at position 302 is travelling along a velocity vector 308. User terminal 116 lies at position 304 indicated by x which lies on cone 306. A maximum effect vector 310 initiates at position 304 and is normal to the surface of cone 306.

Any change in the position of user terminal 116 on the surface of cone 306 would have no impact on Doppler shift. The maximum effect vector 310 depicts the error in the position of user terminal 116.

The variation in the Doppler shift depends upon the location of the user terminal respect to the satellite. This will be further explained with reference to FIG. 4.

Figure 4:
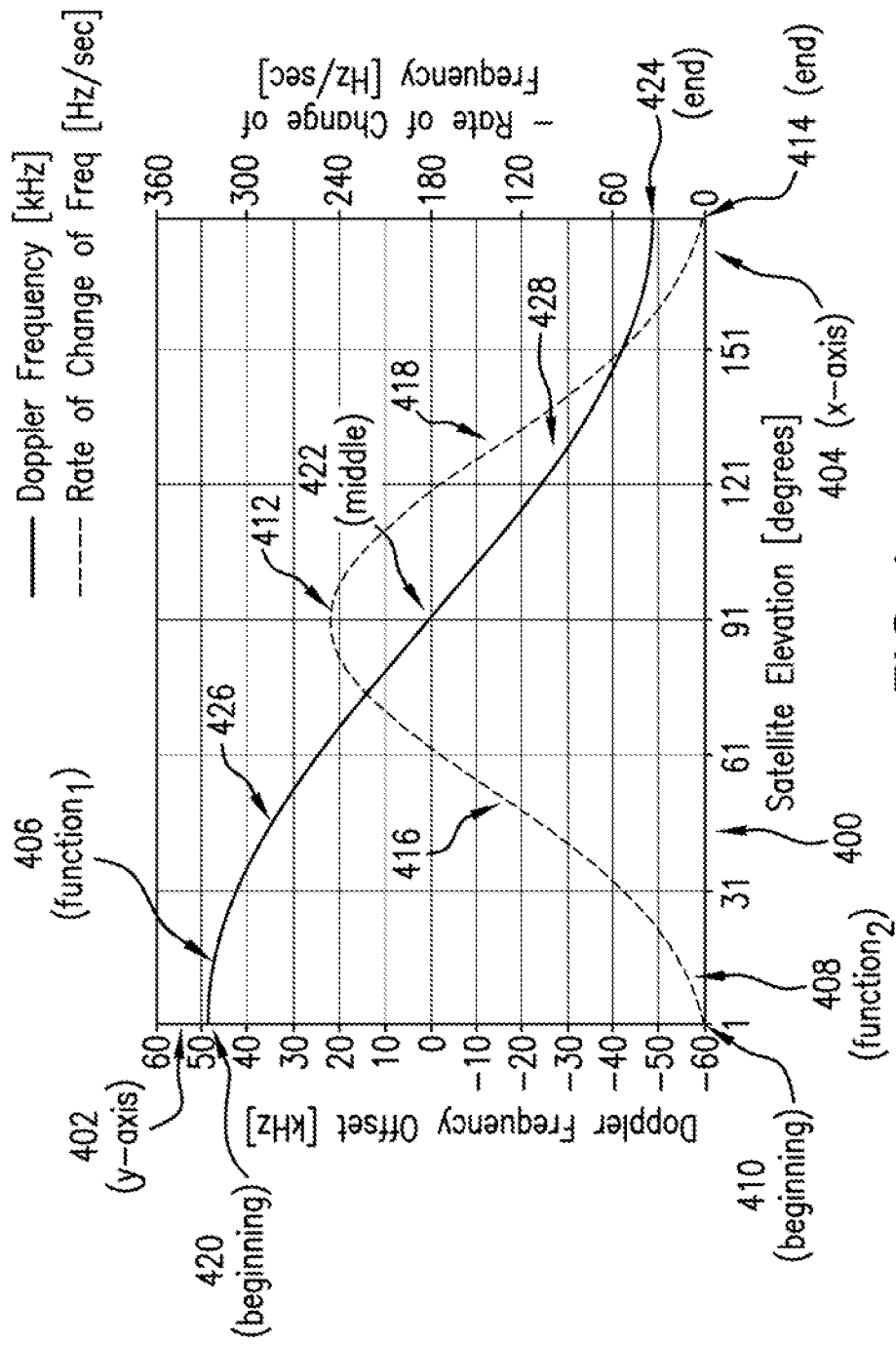
FIG. 4 illustrates a graph of Doppler shift variation based on satellite motion.

FIG. 4 illustrates a graph 400 of Doppler shift variation based on satellite motion.

As shown in the figure, graph 400 includes an x-axis 404 representing Satellite Elevation, a y-axis 402 representing Doppler Frequency Offset, a first function 406 representing Doppler Frequency and a second function 408 representing Rate of Change of Frequency.

Function 406 includes a beginning portion 420, a middle portion 422, and an end portion 424. A decreasing portion 426 is disposed between beginning portion 420 and middle portion 422. A decreasing portion 428 is disposed between middle portion 422 and end portion 424.

Function 408 includes a beginning portion 410, a middle portion 412, and an end portion 414. An increasing portion 416 is disposed between beginning portion 410 and middle portion 412. A decreasing portion 418 is disposed between middle portion 412 and end portion 414.

As satellite 100 passes across the sky, the Doppler frequency varies in the range of approximately −50 kHz as shown by beginning portion 420 to +50 kHz as shown by end portion 424. As satellite 100 moves in the direction of user terminal 116 in car 114, Doppler frequency (i.e., change in frequency based on the velocity) being broadcast is higher by 50 KHz i.e., Doppler frequency is 50 kHz above the 2.5 GHz signal coming out of satellite 100. Similarly, as the satellite 100 passes user terminal 116 in car 114, Doppler frequency being broadcast is lower by 50 kHz. This is denoted by two decreasing portions 426 and 428, where 426 is between beginning position 420 and middle portion 422 and 428 is between middle portion 422 and end portion 424. Therefore, the rate of change of frequency shown by function 408, is always negative, but varies with the change in degrees of satellite elevation. Increasing portion 416 between beginning 410 and middle 412 shows the rate of change of frequency as satellite 100 moves towards user terminal 116. When satellite 100 is directly above user terminal 116 there is a no Doppler shift, but there is a rate-of-change of the Doppler frequency. As satellite 100 moves away from user terminal 116, the decrease in the rate of change of frequency is shown by decreasing portion 418 between middle portion 412 and end portion 414.

The span of a satellite's coverage is in the order of 5000 km. That is, relating Doppler frequency to distance, 1 Hz corresponds to approximately 50 m. From a rate-of-change perspective, 1 Hz/sec corresponds to about 10000 m. Both the Doppler frequency offset and the rate-of-change of frequency offset provide useful metrics.

The observed Doppler frequency depends upon the user terminals actual position. The difference between the observed and expected Doppler frequency provides a good indication of the user terminals estimated position. This will be further explained with reference to FIG. 5.

Figure 5:
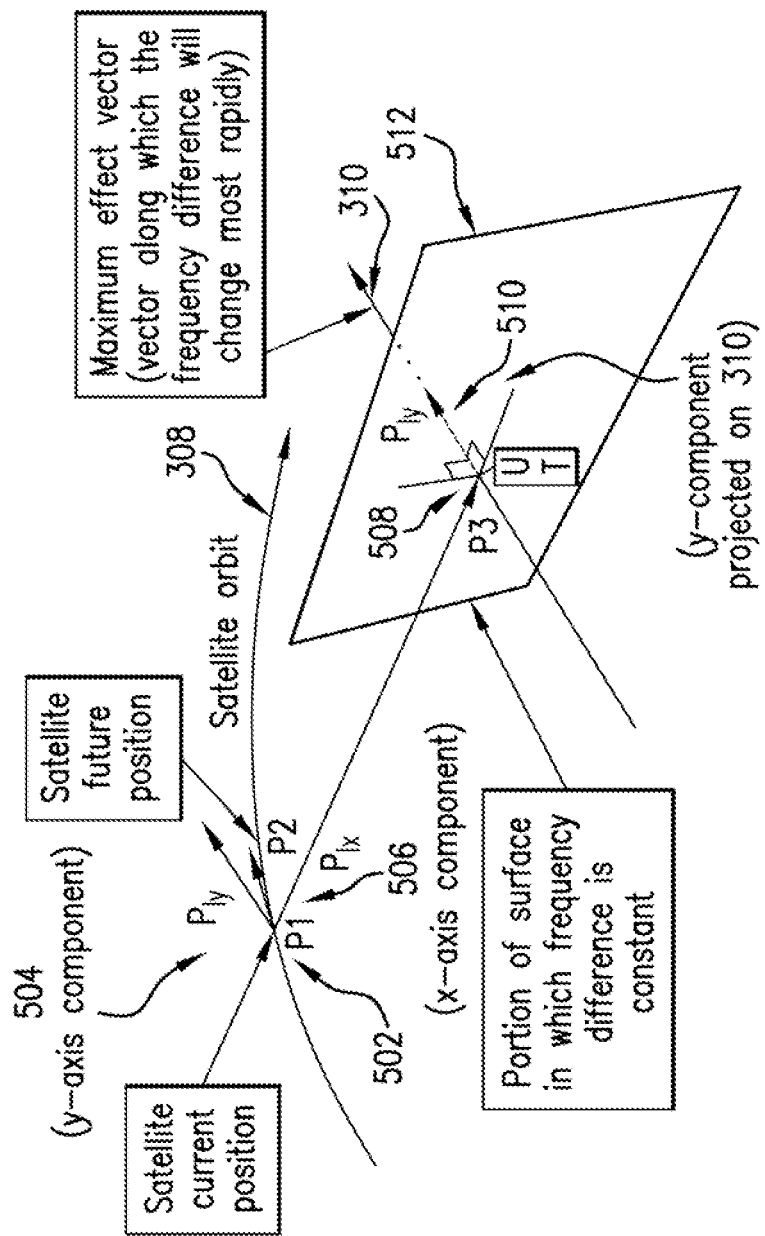
FIG. 5 illustrates the perception of a signal from a satellite by a user terminal.

FIG. 5 illustrates the perception of a signal from satellite 100 by user terminal 116.

As shown is the figure, satellite 100 at position 502 is travelling along a velocity vector 308. User terminal 116 lies at position 508, which lies on a surface 512, a small portion of cone 306 of FIG. 3. Maximum effect vector 310 initiates at position 508 and is normal to surface 512.

The velocity of satellite 100 at position 502 has an x-axis component 506 and a y-axis component 504. Y-axis component 504 may be projected onto maximum effect vector 310 as projection 510.

When satellite 100 is at position 502, user terminal 116 will observe a Doppler shift denoted by $D_m$. Based on its estimated position $P_e$, user terminal 116 can calculate the expected Doppler shift for that position. This is called predetermined received Doppler shift and is denoted by $D_p$. The difference between $D_p$ and $D_m$ is the received signal Doppler shift error, denoted as $D_e$. This received signal Doppler shift error can be used to improve estimated position $P_e$ of user terminal 116.

Any change in the position of user terminal 116 on the surface 512 would have no impact on the received signal Doppler shift error $D_e$. This means, no information can be extracted from the observed Doppler shift error $D_e$ in either dimension of surface 512. Therefore, Doppler shift error $D_e$ suggests an error along the line orthogonal to surface 512 and passing through user terminal 116. This is denoted as the maximum effect vector 310. This Doppler shift error is converted to a distance correction using a factor with a value selected to satisfy the trade between steady state position error and the convergence rate.

Thus, the end result of the above calculation is the change in distance along the maximum effect vector 310 which is either positive or negative. If the change in distance is positive, then the actual distance of user terminal 116 is in the positive direction along the maximum effect vector 310, if the change in distance is negative, then the actual distance of user terminal 116 is in the negative direction along the maximum effect vector 310 from its originally presumed location $P_p$.

Therefore, user terminal 116 can correct its estimated position $P_e$ along a single vector by observing the Doppler shift of a communication from a satellite at a specific time. For example, to find its corrected position in a two dimensional plane, user terminal 116 will have to observe a Doppler shift from more than one position. A more general objective may be to find its corrected position in three dimensional space.

As mentioned above, the Doppler shift of the frequency of the communication signal from a satellite to a user terminal is constant along the surface of a cone based on a vector from the satellite to the user terminal. This will be further explained with reference to the movement of the satellite as shown in FIG. 6.

Figure 6:
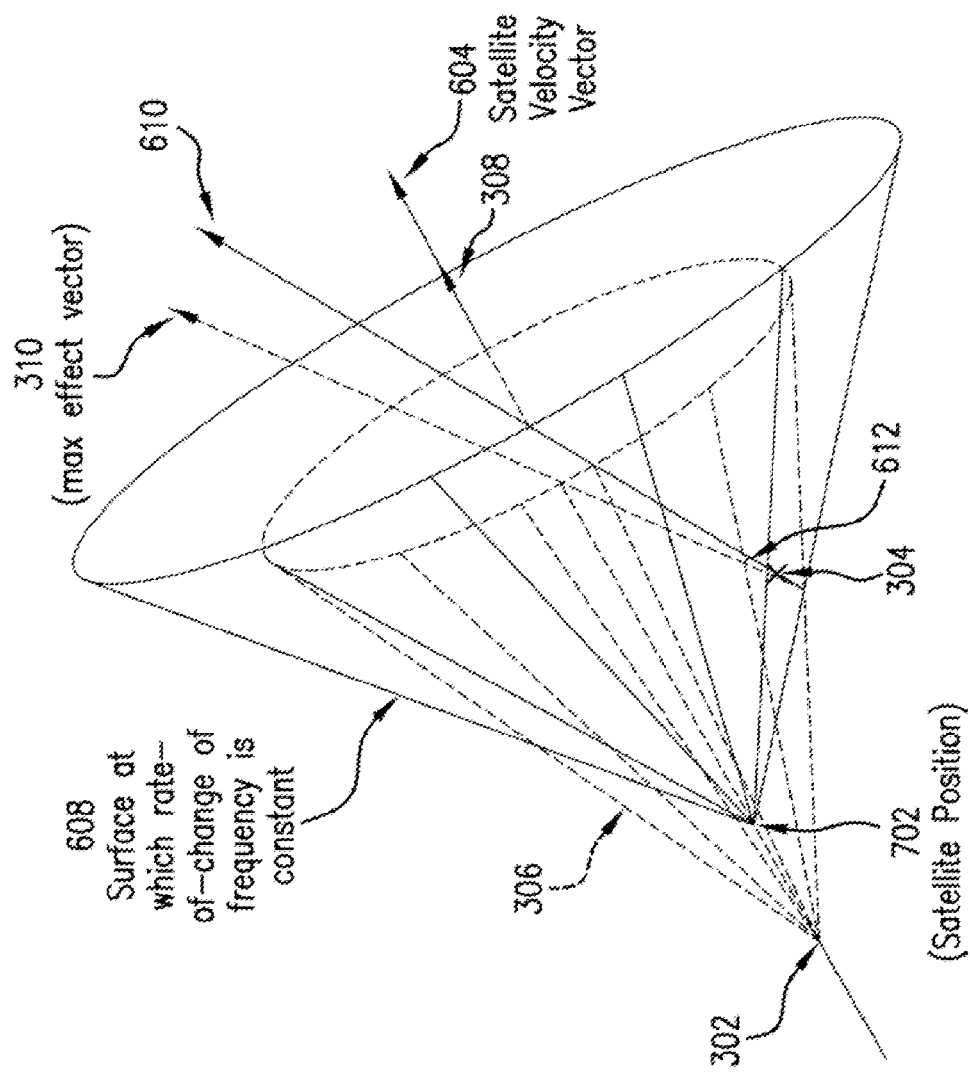
FIG. 6 illustrates the movement of a satellite along the surface of a cone in which a Doppler shift of a signal from the satellite to a user terminal at a time $T_5$ is constant.

FIG. 6 illustrates the movement of a satellite 100 along the surface of a cone in which a Doppler shift of a signal from satellite 100 to user terminal 116 at a time $T_5$ is constant.

As shown in the figure, satellite 100 is at a new position 702 and is travelling along a velocity vector 604. User terminal 116 remains at position 304 on a cone 608. A new maximum effect vector 610 initiates at position 304 and is normal to the surface of cone 608. An angle 612 separates maximum effect vector 310 and maximum effect vector 610.

It is important to note, in this example, that although satellite 100 is moving from 302 to 702, the position of user terminal 116 on the surface of cone 608 is not changing. It should be noted, that in general, user terminal 116 merely needs to be significantly slower than satellite 100. With the two maximum effect vectors 310 and 610, it is possible to determine the position of user terminal 116 within the plane of the two vectors. This will be further explained with reference to FIG. 7.

Figure 7:
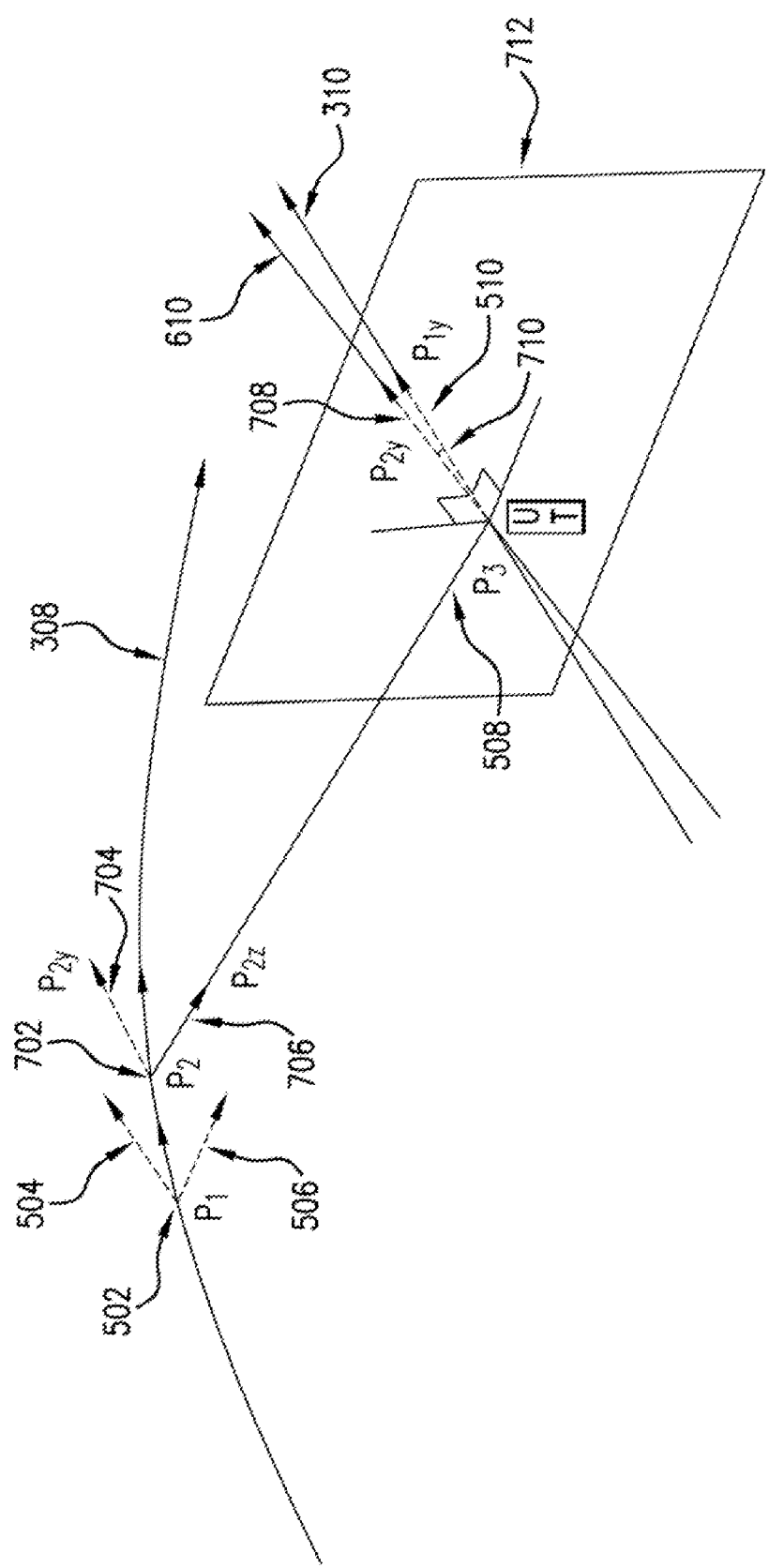
FIG. 7 illustrates an example method how a change in position of a user terminal may be determined based on the perceived Doppler shift of the signal from a satellite 100 at two positions, in accordance with aspects of the present invention.

FIG. 7 illustrates an example method how a change in position of user terminal 116 may be determined based on the perceived Doppler shift of the signal from satellite 100 at position 502 and position 702, in accordance with aspects of the present invention.

As discussed above, at position 502 the velocity of satellite 100 has x-axis component 506 and a y-axis component 504. Y-axis component 504 may be projected onto maximum effect vector 310 as projection 510.

At position 702 the velocity of satellite 100 has x-axis component 706 and a y-axis component 704. Y-axis component 704 may be projected onto maximum effect vector 610 as projection 708.

An angle 710 separates maximum effect vector 310 and maximum effect vector 610.

As discussed above, the position of user terminal 116 can be determined based on the two maximum effect vectors 310 and 610 by calculating the change in $P_e$ along the two maximum effect vectors 310 and 610. If the change is positive $P_e$ moves in the positive direction along the maximum effect vectors and if the change is negative $P_e$ moves in the negative direction along the maximum effect vectors.

Thus, the position of the user terminal can be determined based on the x-axis and y-axis components of the projections of $P_e$ onto the maximum effect vectors 310 and 610. This will be further explained with reference to FIG. 8.

Figure 8:
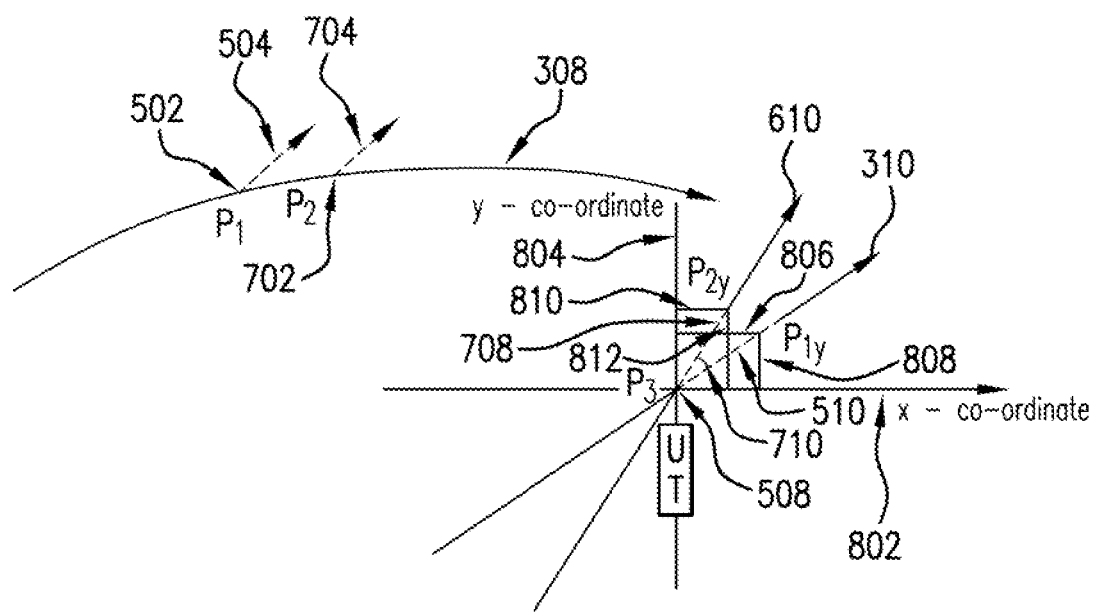
FIG. 8 further describes an example method how a change in position of a user terminal may be determined based on the perceived Doppler shift of the signal from a satellite at two positions, in accordance with aspects of the present invention.

FIG. 8 further describes how a change in position of user terminal 116 may be determined based on the perceived Doppler shift of the signal from satellite 100 at position 502 and position 702, in accordance with aspects of the present invention.

FIG. 8 includes a graph 800 having an x-axis 802 and a y-axis 804, wherein user terminal 116 is disposed at the origin.

As discussed above, Y-axis component 504 may be projected onto maximum effect vector 310 as projection 510. This projection 510 has an x-axis component 806 and a y-axis component 808. As discussed above, Y-axis component 704 may be projected onto maximum effect vector 610 as projection 708. This projection 708 has an x-axis component 810 and a y-axis component 812.

As discussed above, the position of user terminal 116 can be determined based on the magnitude and direction along the two maximum effect vectors 310 and 610. This will also be discussed with reference to the Doppler shift of the signal received from two satellites following different orbits in FIG. 9.

Figure 9:
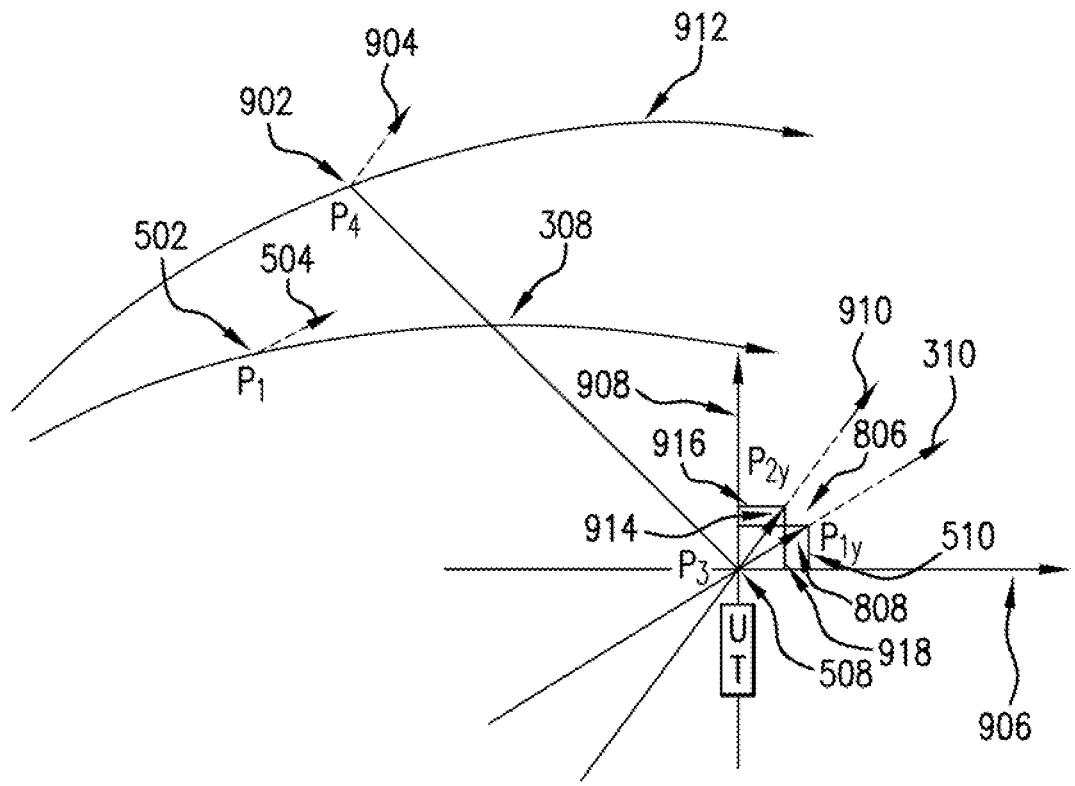
FIG. 9 illustrates another example method how a change in position of a user terminal may be determined based on the perceived Doppler shift of a signal from a satellite at a first position and the perceived Doppler shift of a signal from a second satellite at a second position, in accordance with aspects of the present invention.

FIG. 9 illustrates another example method how a change in position of user terminal 116 may be determined based on the perceived Doppler shift of a signal from satellite 100 at position 502 and the perceived Doppler shift of a signal from a satellite 900 at a position 902, in accordance with aspects of the present invention.

FIG. 9 includes a graph 920 having an x-axis 906 and a y-axis 908, wherein user terminal 116 is disposed at the origin.

As shown in the figure, satellite 900 at position 902 is travelling along a velocity vector 912. The velocity of satellite 900 at position 902 has a y-axis component 904 that may be projected onto maximum effect vector 910 as projection 914. This projection 914 has an x-axis component 916 and a y-axis component 918.

As discussed above, Y-axis component 504 may be projected onto maximum effect vector 310 as projection 510. This projection 510 has an x-axis component 806 and a y-axis component 808.

As discussed above, these x-axis and y-axis components of the projections on the maximum effect vectors 310 and 910 can be used to determine the position of user terminal 116. The estimated position error can be shown graphically as discussed in FIG. 10.

Figure 10:
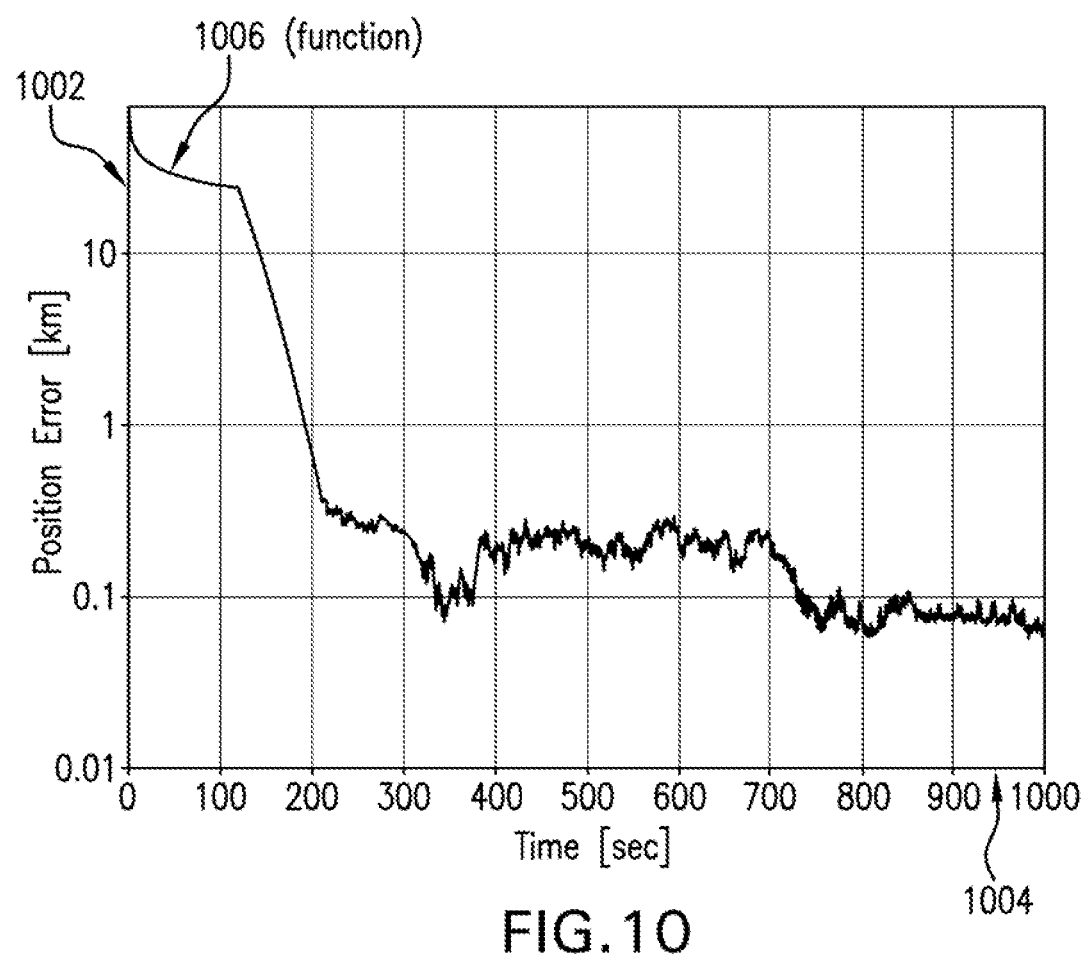
FIG. 10 illustrates a graph of convergence of distance error.

FIG. 10 illustrates a graph of convergence of distance error.

As shown in the figure, graph 1008 includes a x-axis 1004 and a y-axis 1002, and a function 1006.

In accordance with present invention, the communication system arrives at a steady state estimate of its position after 200 seconds. The initial error in terms of distance is approximately 40 km as denoted by 1010. But, after a sequence of iterations this error converges to approximately 100 m as denoted by 1012. The variation of the estimated position due to the errors in the estimation of the frequency will be discussed with reference to FIG. 11.

Figure 11:
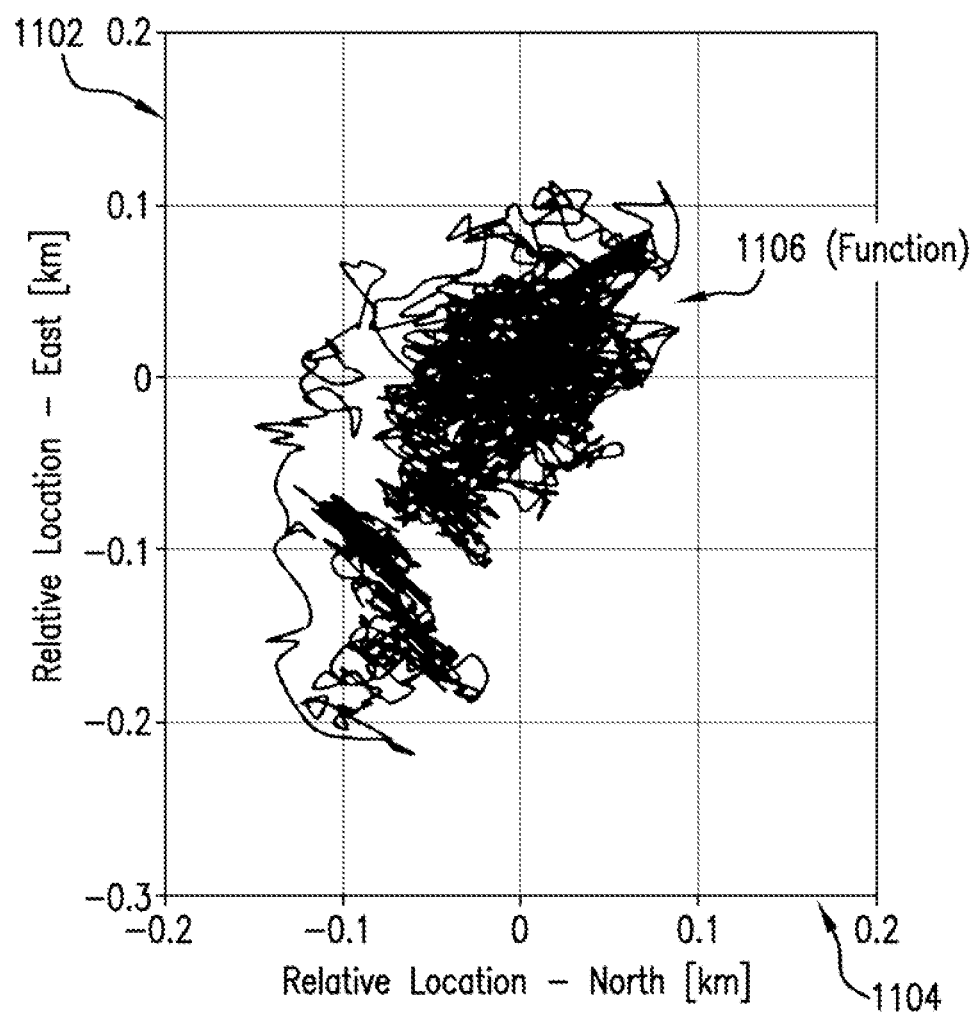
FIG. 11 illustrates a graph of steady state variation of position estimate.

FIG. 11 illustrates a graph of steady state variation of position estimate.

As shown in the figure, graph 1108 includes a x-axis 1104 and a y-axis 1102, and a function 1106.

Once the estimated receiver position $P_e$ has converged, $P_e$ varies (due to frequency estimation errors) as shown in the figure. Here, x-axis 1104 gives the relative location with respect to north-south direction and y-axis 1102 gives the relative location with respect to east-west direction. So, when the estimated error is greater than zero on x-axis 1104, the receiver determines that the position has changed in north direction. On the other hand, when the estimated error is less than zero on x-axis 1104, the receiver determines that the position has changed in south direction. Similarly, on y-axis 1102, when the estimated error is greater than zero, the receiver determines that the position has changed in east direction and when the estimated error is less than zero the receiver determines that the position has changed in west direction. While the receiver is going through these iterations (e.g. as discussed in the embodiment above with reference to FIG. 8 which uses measurement from one satellite along one orbit or the embodiment above with reference to FIG. 9 which uses measurements from two satellites along two different orbits), the receiver is constantly checking the Doppler shift of the frequency of the communication from that satellite and estimating a change in the position of the user terminal as discussed above with reference to FIG. 8 or FIG. 9. From function 1106, it can be seen that the position is constantly changing but generally staying in an area of about 0.2 km sq. All this has been achieved without the use of a GPS satellite.

Figure 12:
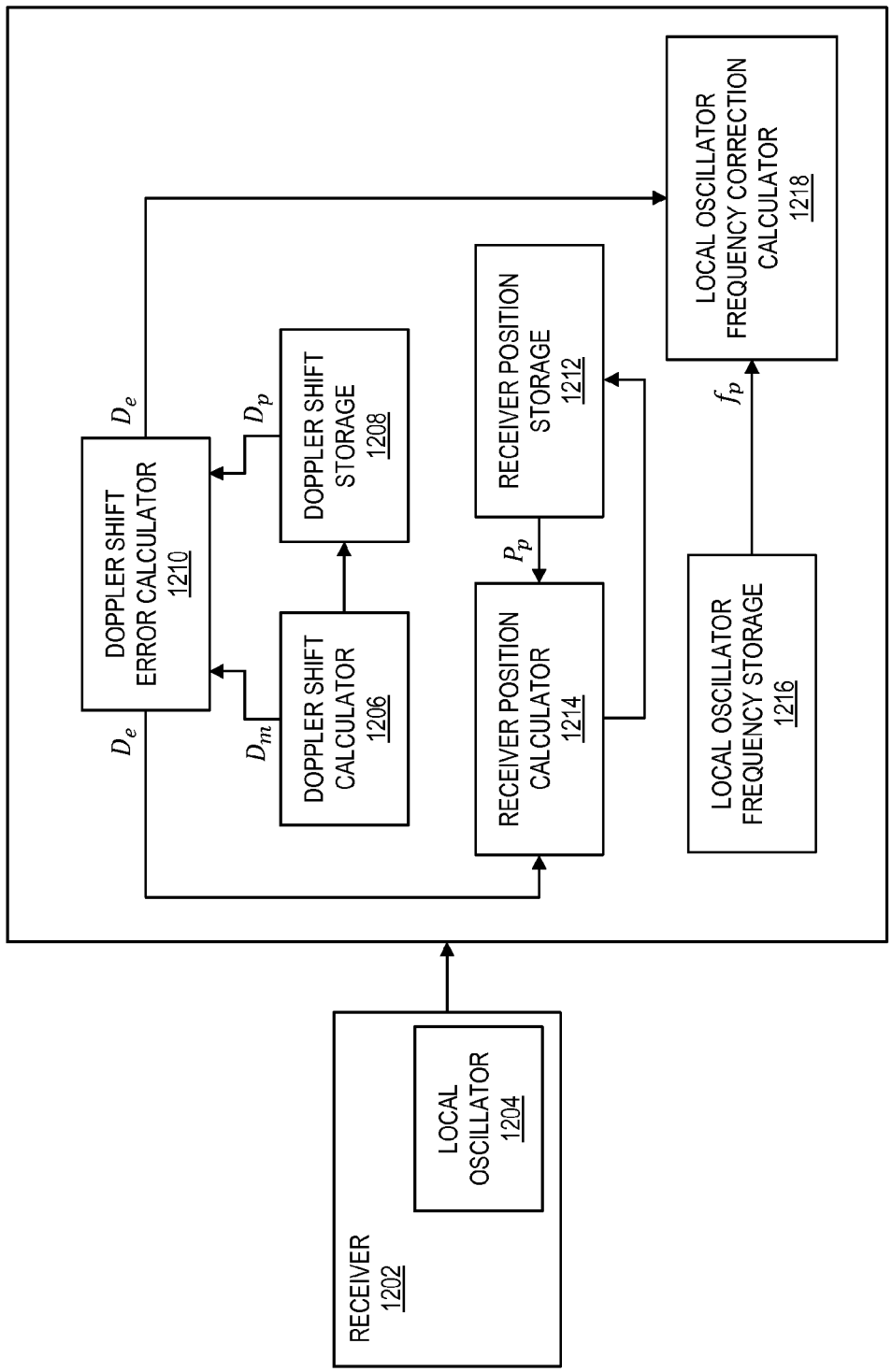
FIG. 12 illustrates the block diagram of a system in accordance with aspects of the present invention for estimating terminal position based on non-geostationary communication satellite signals.
Figure 13:
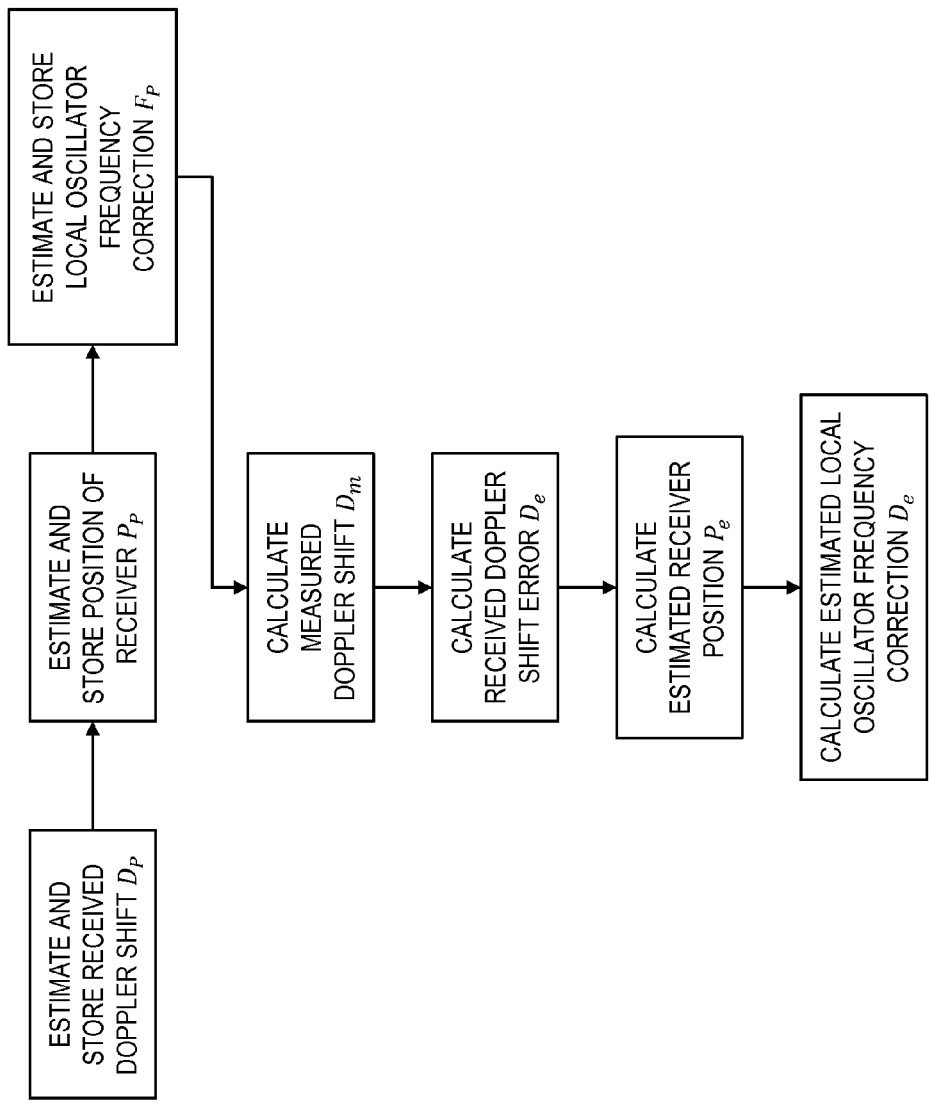
FIG. 13 illustrates a flow chart depicting a method in accordance with aspects of the present invention for estimating terminal position based on non-geostationary communication satellite signals.

FIG. 12 illustrates the block diagram of a system 1200 for estimating terminal position based on non-geostationary communication satellite signals.

As shown in the figure, system 1200 includes a device 1220 for use with a satellite and a receiver 1202.

Receiver 1202 includes a local oscillator 1204 being operable to oscillate with a local oscillating frequency. The local oscillator has a fairly large error, approximately 12.5 kHz, when viewed at the carrier frequency, which may be approximately 2.5 GHz. User terminal 116 corrects this error by using the signal received from the satellite.

Device 1220 includes a Doppler shift calculating portion 1206, a predetermined Doppler shift storage portion 1208, a received signal Doppler shift error calculating portion 1210, a predetermined receiver position storage portion 1212, a receiver position estimating portion 1214, a local oscillator frequency correction storage portion 1216, and a local oscillator frequency correction portion 1218.

As discussed above, based on the last known position of user terminal 116 and the description of the satellite's orbit (ephemeris data), device 1220 estimates the received Doppler shift $D_p$ from the satellite, the position $P_p$ of receiver 1202 as well as the local oscillator frequency correction $f_p$. Predetermined Doppler shift storage portion 1208 stores the predetermined received Doppler shift $D_p$. Predetermined receiver position storage portion 1212 stores the predetermined position $P_p$ of the receiver and local oscillator frequency correction storage portion 1216 stores predetermined local oscillator frequency correction L. The device calculates $D_p$, $P_p$ and $f_p$ for each signal received from every selected satellite.

Based on the velocity vector and signal received from satellite, Doppler shift calculating portion 1206 calculates a measured Doppler shift $D_m$. Based on this, received signal Doppler shift error calculating portion 1210 calculates the received signal Doppler shift error $D_e$ such that $$D_e = D_p - D_m \tag{1}$$

Similarly, receiver position estimating portion 1214 calculates the estimated receiver position $P_e$ such that $$P_e = P_p + (K_2 \times D_e) \tag{2}$$

as projected onto the maximum effect vector. Here $K_2$ is a predetermined value that defines the bandwidth of the position estimation loop. Local oscillator frequency correction portion 1218 calculates the estimated local oscillator frequency correction $f_e$ such that $$f_e = f_p + (K_1 \times D_e) \quad (3)$$

$K_1$ is a predetermined value that defines the bandwidth of the frequency estimation loop.

Device 1220 performs the above calculations for signal received from multiple satellites that are moving at different velocities at different positions. The calculations go through a sequence of iterations and finally converge to a steady-state position of user terminal 116.

It should be noted that the example embodiments discussed above that use Doppler shift of a communication satellite signal to determine a terminal's position are a non-limiting examples. Aspects of the present invention may employ other metrics from a communication satellite signal to determine a terminal's position. Non-limiting examples of other such metrics include a rate of change of a Doppler shift, and a rate of change of the rate of change of a Doppler shift.

As discussed above, the prior art relics on available GPS satellites. This dependency prevents the user terminal from determining its position if it is not able to communicate with GPS satellites. The present invention solves this problem by using Doppler shift frequency as a metric for calculating the user terminal position. The present invention achieves this by comparing the actual Doppler shift frequency with the expected Doppler shift frequency and using this comparison to determine the estimated position of the user terminal. Since the present invention uses satellites unrelated to GPS, the present invention eliminates the need to communicate with the GPS satellite.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device comprising:
   a receiver configured to receive ephemeris and time information regarding a communications satellite, and to receive a signal transmitted from the satellite, wherein the ephemeris information reflects velocity and direction data regarding the satellite;
   a Doppler shift calculator configured to determine an expected Doppler shift $D_p$ and a measured Doppler shift $D_m$ based on the ephemeris information, a last known position of the device and the received signal;
   a Doppler shift error calculator configured to determine a Doppler shift error $D_e$ based on the expected Doppler shift $D_p$ and the measured Doppler shift $D_m$; and
   a position calculator configured to determine a predetermined position $P_p$ of the device based on the ephemeris information and the last known position of the device, and to determine an estimated change in distance $P_e$ of the device, along a maximum effect vector from the predetermined position $P_p$, based on the predetermined position $P_p$ and the Doppler shift error $D_e$.

2. The device according to claim 1, wherein the Doppler shift error is determined as $D_e = D_p - D_m$.

3. The device according to claim 2, wherein the estimated change in distance of the device is determined as $P_e = P_p + (K_2 \times D_e)$, wherein $K_2$ is a predetermined value associated with a position estimation loop.

4. The device according to claim 1, further comprising:
   a frequency calculator configured to determine a frequency correction factor $f_e$, for correcting a local oscillator frequency, based on a predetermined oscillator frequency $f_p$ and the Doppler shift error $D_e$.

5. The device according to claim 4, wherein the Doppler shift error is determined as $D_e = D_p - D_m$.

6. The device according to claim 5, wherein the frequency correction factor is determined as $f_e = f_p + (K_1 \times D_e)$, wherein $K_1$ is a predetermined value associated with a frequency estimation loop of the device.

7. The device according to claim 5, wherein the estimated change in distance of the device is determined as $P_e = P_p + (K_2 \times D_e)$, wherein $K_2$ is a predetermined value associated with a position estimation loop of the device.

8. The device according to claim 7, wherein the frequency correction factor is determined as $f_e = f_p + (K_1 \times D_e)$, wherein $K_1$ is a predetermined value associated with a frequency estimation loop of the device.

9. A method comprising:
   receiving, by a satellite terminal (ST), ephemeris and time information regarding a communications satellite, and receiving a signal transmitted from the satellite, wherein the ephemeris information reflects velocity and direction data regarding the satellite;
   determining an expected Doppler shift $D_p$ and a measured Doppler shift $D_m$ based on the ephemeris information, a last known position of the ST and the received signal;
   determining a Doppler shift error $D_e$ based on the expected Doppler shift $D_p$ and the measured Doppler shift $D_m$; and
   determining a predetermined position $P_p$ of the ST based on the ephemeris information and the last known position of the ST, and determining an estimated change in distance $P_e$ of the ST, along a maximum effect vector from the predetermined position $P_p$, based on the predetermined position $P_p$ and the Doppler shift error $D_e$.

10. The method according to claim 9, wherein the Doppler shift error is determined as $D_e = D_p - D_m$.

11. The method according to claim 10, wherein the estimated change in distance of the ST is determined as $P_e = P_p + (K_2 \times D_e)$, wherein $K_2$ is a predetermined value associated with a position estimation loop.

12. The method according to claim 9, further comprising:
    a frequency calculator configured to determine a frequency correction factor $f_e$, for correcting a local oscillator frequency, based on a predetermined oscillator frequency $f_p$ and the Doppler shift error $D_e$.

13. The method according to claim 12, wherein the Doppler shift error is determined as $D_e = D_p - D_m$.

14. The method according to claim 12, wherein the frequency correction factor is determined as $f_e = f_p + (K_1 \times D_e)$, wherein $K_1$ is a predetermined value associated with a frequency estimation loop of the ST.

15. The method according to claim 13, wherein the estimated change in distance of the ST is determined as $P_e = P_p + (K_2 \times D_e)$, wherein $K_2$ is a predetermined value associated with a position estimation loop of the ST.

16. The method according to claim 15, wherein the frequency correction factor is determined as $f_e = f_p + (K_1 \times D_e)$, wherein $K_1$ is a predetermined value associated with a frequency estimation loop of the ST.

* * * * *